United States Patent
Flamm et al.

(10) Patent No.: US 11,980,968 B2
(45) Date of Patent: May 14, 2024

(54) METHODS AND SYSTEMS FOR ADDITIVE TOOL MANUFACTURING

(71) Applicant: Lincoln Global, Inc., Santa Fe Springs, CA (US)

(72) Inventors: Jason K. Flamm, Fort Collins, CO (US); William T. Matthews, Chesterland, OH (US); Michael A. Kottman, Cleveland, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 547 days.

(21) Appl. No.: 16/025,020

(22) Filed: Jul. 2, 2018

(65) Prior Publication Data

US 2019/0160594 A1 May 30, 2019

Related U.S. Application Data

(60) Provisional application No. 62/592,045, filed on Nov. 29, 2017.

(51) Int. Cl.
*B23K 26/342* (2014.01)
*B22F 10/00* (2021.01)
(Continued)

(52) U.S. Cl.
CPC ............ *B23K 26/342* (2015.10); *B22F 10/00* (2021.01); *B22F 10/22* (2021.01); *B22F 10/366* (2021.01);
(Continued)

(58) Field of Classification Search
None
See application file for complete search history.

(56) References Cited

U.S. PATENT DOCUMENTS

| 2,191,469 | A | * | 2/1940 | Hopkins | ................ B23K 9/038 |
| | | | | | 427/580 |
| 2,436,387 | A | * | 2/1948 | Harter | ................ B23K 9/0678 |
| | | | | | 219/124.5 |

(Continued)

FOREIGN PATENT DOCUMENTS

| CN | 1793423 A | 6/2006 |
| CN | 102665993 A | 9/2012 |

(Continued)

OTHER PUBLICATIONS

Akuula; "Hybrid adaptive layer manufacturing: An Intelligent art of direct metal rapid tooling process"; Robotics and Computer-Integrated Manufacturing; vol. 22; Published 2006; pp. 113-123.

(Continued)

*Primary Examiner* — Nathaniel E Wiehe
*Assistant Examiner* — Spencer H. Kirkwood
(74) *Attorney, Agent, or Firm* — Brad C. Spencer

(57) ABSTRACT

An additive manufacturing system includes an electrode head comprising an array of electrodes for depositing material to form a three-dimensional part. The array includes a first plurality of electrodes formed from a first metallic material having a first ductility and a first hardness, and a second plurality of electrodes formed from a second metallic material having a second ductility and a second hardness, wherein the first ductility is greater than the second ductility and the second hardness is greater than the first hardness. A power source provides electrical power for establishing a welding arc for each electrode. A drive roll system drives each electrode. A controller is connected to the power source to control operations of the additive manufacturing system to form an interior portion of the part using the first plurality of electrodes, and control the operations of the additive manufacturing system to form an exterior portion of the part using the second plurality of electrodes, such that ductility (Continued)

of the interior portion of the part is greater than ductility of the exterior portion of the part.

8 Claims, 8 Drawing Sheets

(51) Int. Cl.
| | |
|---|---|
| B22F 10/22 | (2021.01) |
| B22F 10/366 | (2021.01) |
| B22F 12/00 | (2021.01) |
| B22F 12/50 | (2021.01) |
| B22F 12/55 | (2021.01) |
| B22F 12/57 | (2021.01) |
| B23K 9/04 | (2006.01) |
| B23K 9/32 | (2006.01) |
| B23K 26/34 | (2014.01) |
| B23K 26/354 | (2014.01) |
| B23K 103/00 | (2006.01) |
| B23K 103/02 | (2006.01) |
| B28B 1/00 | (2006.01) |
| B29C 64/00 | (2017.01) |
| B33Y 10/00 | (2015.01) |
| B33Y 30/00 | (2015.01) |
| B33Y 40/00 | (2020.01) |
| B33Y 40/20 | (2020.01) |
| B22F 10/43 | (2021.01) |
| B22F 10/47 | (2021.01) |

(52) U.S. Cl.
CPC .............. *B22F 12/00* (2021.01); *B22F 12/55* (2021.01); *B22F 12/57* (2021.01); *B23K 9/044* (2013.01); *B23K 9/324* (2013.01); *B23K 26/34* (2013.01); *B23K 26/354* (2015.10); *B28B 1/001* (2013.01); *B29C 64/00* (2017.08); *B33Y 10/00* (2014.12); *B33Y 30/00* (2014.12); *B33Y 40/00* (2014.12); *B33Y 40/20* (2020.01); *B22F 10/43* (2021.01); *B22F 10/47* (2021.01); *B22F 12/50* (2021.01); *B23K 2103/02* (2018.08); *B23K 2103/52* (2018.08)

(56) References Cited

U.S. PATENT DOCUMENTS

| | | | | |
|---|---|---|---|---|
| 2,868,956 | A * | 1/1959 | Lobosco | B23K 9/0678 219/137 R |
| 3,342,973 | A * | 9/1967 | Smith | B23K 9/0052 219/137 R |
| 3,617,690 | A * | 11/1971 | Terai | B23K 9/0213 219/137 R |
| 3,624,345 | A * | 11/1971 | Armstrong | B23K 9/188 219/76.14 |
| 3,704,358 | A * | 11/1972 | Saito | B23K 9/184 219/137 R |
| 4,430,115 | A | 2/1984 | Ray et al. | |
| 5,308,409 | A * | 5/1994 | Kamimura | B23K 9/04 148/512 |
| 5,714,735 | A * | 2/1998 | Offer | B23K 9/1093 219/136 |
| 5,864,955 | A | 2/1999 | Hirai | |
| 6,144,008 | A | 11/2000 | Rabinovich | |
| 6,405,095 | B1 * | 6/2002 | Jang | B22F 1/0003 700/118 |
| 6,526,327 | B2 | 2/2003 | Kar et al. | |
| 6,940,037 | B1 | 9/2005 | Kovacevic et al. | |
| 6,968,990 | B2 * | 11/2005 | Ott | B22F 9/28 228/203 |
| 7,704,565 | B2 | 4/2010 | Slaughter | |
| 8,399,792 | B2 * | 3/2013 | Peters | B23K 9/122 219/76.14 |
| 8,664,568 | B2 * | 3/2014 | Fujiwara | B23K 9/1037 219/137 R |
| 8,946,582 | B1 * | 2/2015 | Bong | B23K 9/18 219/73.21 |
| 8,952,292 | B2 * | 2/2015 | Behmlander | B23K 9/1735 219/136 |
| 9,011,136 | B1 | 4/2015 | Uzan et al. | |
| 9,162,305 | B2 | 10/2015 | Brass et al. | |
| 9,266,181 | B2 | 2/2016 | Flagg et al. | |
| 9,321,117 | B2 * | 4/2016 | Beary | B23K 9/04 |
| 9,352,413 | B2 | 5/2016 | Bruck et al. | |
| 9,776,282 | B2 * | 10/2017 | Subramanian | B22F 10/20 |
| 9,833,862 | B2 | 12/2017 | Denney et al. | |
| 10,500,672 | B2 * | 12/2019 | Bush | B23K 9/04 |
| 10,682,717 | B2 * | 6/2020 | Daniel | B23K 9/0735 |
| 2002/0139778 | A1 * | 10/2002 | Jones | B23K 9/04 219/76.14 |
| 2010/0101470 | A1 * | 4/2010 | Hillenbrand | D05C 15/22 427/404 |
| 2010/0326963 | A1 * | 12/2010 | Peters | B23K 9/04 219/76.1 |
| 2011/0168676 | A1 * | 7/2011 | Peters | A61B 10/0045 219/73.1 |
| 2012/0325779 | A1 | 12/2012 | Yelistratov | |
| 2014/0131323 | A1 * | 5/2014 | Flagg | B23K 9/184 219/76.14 |
| 2014/0339203 | A1 * | 11/2014 | Peters | B23K 9/1735 219/76.14 |
| 2015/0014885 | A1 | 1/2015 | Hofmann et al. | |
| 2015/0021379 | A1 * | 1/2015 | Albrecht | B23K 20/00 228/256 |
| 2015/0021815 | A1 | 1/2015 | Albrecht et al. | |
| 2015/0044084 | A1 | 2/2015 | Hofmann et al. | |
| 2015/0209905 | A1 | 7/2015 | Matthews et al. | |
| 2015/0275687 | A1 * | 10/2015 | Bruck | B05D 3/0254 277/345 |
| 2015/0321295 | A1 | 11/2015 | Van Der Mee et al. | |
| 2015/0352770 | A1 | 12/2015 | Busenbecker | |
| 2015/0360317 | A1 * | 12/2015 | Kalvala | B23K 35/0261 228/2.3 |
| 2016/0016254 | A1 | 1/2016 | Stecker et al. | |
| 2016/0032766 | A1 | 2/2016 | Bunker et al. | |
| 2016/0251736 | A1 | 9/2016 | Shimizu | |
| 2016/0263823 | A1 * | 9/2016 | Espiau | B33Y 70/00 |
| 2016/0318130 | A1 * | 11/2016 | Stempfer | B33Y 30/00 |
| 2017/0008114 | A1 | 1/2017 | Langham et al. | |
| 2017/0014901 | A1 * | 1/2017 | Powell | C21D 1/18 |
| 2017/0066083 | A1 | 3/2017 | Shioya et al. | |
| 2017/0072471 | A1 * | 3/2017 | Welch | B33Y 80/00 |
| 2017/0165917 | A1 * | 6/2017 | McKiel, Jr. | B29C 64/393 |
| 2017/0173735 | A1 | 6/2017 | Hsu | |
| 2017/0232518 | A1 * | 8/2017 | Shi | B23K 26/342 419/7 |
| 2017/0326690 | A1 | 11/2017 | Heard et al. | |
| 2018/0085995 | A1 | 3/2018 | Davis | |
| 2018/0111179 | A1 * | 4/2018 | Sohmshetty | C21D 1/673 |
| 2018/0319097 | A1 * | 11/2018 | Narayanan | B23K 9/125 |

FOREIGN PATENT DOCUMENTS

| | | |
|---|---|---|
| CN | 203109235 U | 8/2013 |
| CN | 103802317 A | 5/2014 |
| CN | 105531060 A | 4/2016 |
| CN | 105728731 A | 7/2016 |
| CN | 105945281 A | 9/2016 |
| CN | 106607587 A | 5/2017 |
| CN | 107138829 A | 9/2017 |
| CN | 107470624 A | 12/2017 |
| DE | 10 2007 056259 A1 | 6/2009 |
| DE | 10 2010 025950 A1 | 1/2012 |
| EP | 2 498 935 A1 | 9/2012 |
| EP | 2 555 902 A1 | 2/2013 |
| EP | 3 213 863 A1 | 9/2017 |
| GB | 1 239 587 A | 7/1971 |
| JP | S52-39545 A | 3/1977 |
| JP | 2008-208778 A | 9/2008 |

(56) References Cited

FOREIGN PATENT DOCUMENTS

| JP | 2017-075362 A | 4/2017 |
|---|---|---|
| WO | 2013/112217 A2 | 8/2013 |
| WO | 2016/019434 A1 | 2/2016 |

OTHER PUBLICATIONS

America Makes; "4062 Multi-Source/Feedstock/Meter-Scale Metal AM Machine"; https://www.americamakes.us/portfolio/4062-multi-sourcefeedstockmeter-scale-metal-machine/; May 17, 2018; pp. 1-3.

Abe, et al.; "Dissimilar metal deposition with a stainless steel and nickel-based alloy using wire and arc-based additive manufacturing;" Precision Engineering; Elsevier; vol. 45; Dated Mar. 25, 2016; pp. 387-395.

Bayode, et al.; "Effect of Scanning Speed on Laser Deposited 17-4PH Stainless Steel;" 8th International Conference on Mechanical and Intelligent Manufacturing Technologies (ICMIMT); IEEE; Dated Feb. 3, 2017; pp. 1-5.

Extended European Search Report from Corresponding Application No. 18209304.7; dated Mar. 14, 2019; pp. 1-15.

Extended European Search Report from Corresponding Application No. 18209097.7; dated Mar. 13, 2019; pp. 1-12.

Cyr, et al.; "Fracture behaviour of additively manufactured MS1-H13 hybrid hard steels;" Materials Letters; Elsevier; vol. 212; Dated Oct. 21, 2017; pp. 174-177.

Baek, et al.; "Mechanical Characteristics of a Tool Steel Layer Deposited by Using Direct Energy Deposition;" Metals and Materials International, Korean Institute of Metals and Materials; vol. 23, No. 4; Dated Jul. 12, 2017; pp. 770-777.

Extended European Search Report from Corresponding Application No. 18209292.4; dated Mar. 18, 2019; pp. 1-15.

Extended European Search Report from Corresponding Application No. 18209284_1; dated May 9, 2019; pp. 1-11.

Partial European Search Report from Corresponding Application No. 18209270.0-1016; dated May 24, 2019; pp. 1-14.

Extended European Search Report from Corresponding Application No. 18209298.1-1016; dated Jun. 21, 2019; pp. 1-9.

Nie, et al.; "Experimental Study and Modeling of H13 Steel Deposition Using Laser Hot-Wire Additive Manufacturing;" Journal of Materials Processing Technology, vol. 235, Dated Sep. 30, 2016; pp. 171-186.

* cited by examiner

METHODS AND SYSTEMS FOR ADDITIVE TOOL MANUFACTURING

CROSS-REFERENCE TO RELATED APPLICATIONS

Benefit of U.S. Provisional Patent Application Ser. No. 62/592,045 filed Nov. 29, 2017, is hereby claimed and the disclosure incorporated herein by reference.

FIELD

Embodiments of the present invention relate to systems and methods related to welding, or technology resembling welding (e.g., cladding), and more specifically to additive tool manufacturing using multiple processes.

BACKGROUND

Conventionally, additive manufacturing processes are able to make near net shape parts at relatively low deposition rates (e.g., powder: 30-100 cm$^3$/hr; wire: 800-2000 cm$^3$/hr) where each part is built up layer-by-layer. Build times can be long and, occasionally, defects such as lack-of-fusion caused by low heat inputs can be created. Wire-based additive manufacturing processes can have higher deposition rates than powder-based processes; however, powder-based processes can have a higher resolution for more detailed features. Thus, different additive manufacturing processes have advantages and disadvantages that should be considered when manufacturing near net shape parts.

Traditionally, jigs, fixtures, dies, molds, machine tools, cutting tools, gauges, and other tools (generally referred to herein as tools or tooling) are used in various manufacturing processes. Such tooling is typically made to be very hard to perform a particular function (e.g., metal stamping or forging) and tends to have a high carbon content. Tooling is often made of very hard material that is machined from a single piece of wrought material. For example, hard tools are often made by forming a martensitic structure (e.g., martensite) via rapid cooling. A martensitic structure commonly refers to a very hard form of steel crystalline structure, but may also refer to any crystal structure that is formed by diffusionless transformation. In general, martensite is a hard and very brittle solid solution of carbon in iron that is the main component of hardened steel. While hardness of the tooling is often needed to perform a manufacturing function, such hard tooling is prone to cracking because the carbon content is so high. Typically, however, only a fraction of the surface of the tooling experiences high stresses and/or temperatures during use, while the rest of the tooling does not.

SUMMARY

Embodiments of the present invention include processes, compositions, and structures related to additive manufacturing for tooling. Such tooling may be used for stamping, forging, or casting metals via hot or cold processes, for example, or for extruding metals or plastics. Also, tooling may be used for injection of metal, plastic, or glass, for example, in an injection molding process. Furthermore, tooling may be used in processes that use fiberglass or carbon fiber, for example. Such tooling may be required to operate in hot and/or cold environments and be resistant to one or more of impact, wear, deformation, corrosion, thermal shock, and erosion. For example, Invar is a nickel-iron alloy having a low coefficient of thermal expansion. The processes, compositions, and structures described herein for additive manufacturing of tooling are different than traditional non-additive approaches. Manufacturing/fabricating tooling (which contains high levels of carbon) via additive manufacturing is very difficult because of the hard and brittle nature of such deposits. Therefore, making tooling via an additive manufacturing process does not use the same alloy content as traditionally made tooling. For additive tool manufacturing, carbon may be replaced with some other alloy and cooling rates are controlled to provide the strength and other desirable characteristics of the tooling.

In one embodiment, an additive manufacturing system includes an electrode head comprising an array of multiple electrodes for depositing material layer by layer to form a three-dimensional (3D) part. The array of multiple electrodes includes a first plurality of electrodes formed from a first metallic material having a first ductility and a first hardness, and a second plurality of electrodes formed from a second metallic material having a second ductility and a second hardness, wherein the first ductility is greater than the second ductility and the second hardness is greater than the first hardness. A power source is configured to provide electrical power for establishing a welding arc for each electrode of the array of multiple electrodes. A drive roll system is configured to drive each electrode of the array of multiple electrodes. A controller is operatively connected to the power source and configured to control operations of the additive manufacturing system to form an interior portion of the part using the first plurality of electrodes, and control the operations of the additive manufacturing system to form an exterior portion of the part, surrounding the interior portion of the part, using the second plurality of electrodes, such that ductility of the interior portion of the part is greater than ductility of the exterior portion of the part. In one embodiment, the electrodes of the array of multiple electrodes are consumable welding wires. In one embodiment, the controller is programmed to operate the additive manufacturing system to deposit the material at areas defined by a computer aided design (CAD) model of the part. The additive manufacturing system can include a thermal spray subsystem operatively connected to the controller, wherein the controller is configured to control operations of the thermal spray subsystem to apply a metallic coating on the part. The additive manufacturing system can include a blown powder laser subsystem operatively connected to the controller, wherein the controller is configured to control operations of the blown powder laser subsystem to form a high resolution portion of the part having a higher resolution than said interior portion and said exterior portion. In one embodiment, the controller is configured to control the operations of the additive manufacturing system to form a transition portion of the part, extending between the interior portion and the exterior portion, using both of the first plurality of electrodes and the second plurality of electrodes such that the transition portion is an alloy formed from the first metallic material and the second metallic material. In a further embodiment, a proportion of the first metallic material to the second metallic material decreases through the transition portion from the interior portion to the exterior portion.

In one embodiment, the additive manufacturing system includes an electrode head comprising an array of multiple electrodes for depositing material layer by layer to form a three-dimensional (3D) part. The array of multiple electrodes includes a first plurality of electrodes formed from a first metallic composition, and a second plurality of electrodes formed from a second metallic composition different from the first metallic composition. A power source is configured to provide electrical power for establishing a welding arc for each electrode of the array of multiple electrodes. A drive roll system is configured to drive each electrode of the array of multiple electrodes. A controller is operatively connected to the power source and configured to control operations of the additive manufacturing system to form an interior portion of the part using the first plurality of electrodes but not the second plurality of electrodes, control the operations of the additive manufacturing system to form an exterior portion of the part using the second plurality of electrodes but not the first plurality of electrodes, and control the operations of the additive manufacturing system to form a transition portion of the part, extending between the interior portion and the exterior portion, using both of the first plurality of electrodes and the second plurality of electrodes such that the transition portion is an alloy formed from the first metallic composition and the second metallic composition. In one embodiment, the electrodes of the array of multiple electrodes are consumable welding wires. In one embodiment, the controller is programmed to operate the additive manufacturing system to deposit the material at areas defined by a computer aided design (CAD) model of the part. The additive manufacturing system can include a thermal spray subsystem operatively connected to the controller, wherein the controller is configured to control operations of the thermal spray subsystem to apply a metallic coating on the part. The additive manufacturing system can include a blown powder laser subsystem operatively connected to the controller, wherein the controller is configured to control operations of the blown powder laser subsystem to form a high resolution portion of the part having a higher resolution than said interior portion and said exterior portion. In one embodiment, a proportion of the first metallic composition to the second metallic composition decreases through the transition portion from the interior portion to the exterior portion. In a further embodiment, the first metallic composition is a carbon steel and the second metallic composition is a stainless steel.

One embodiment includes a method of additively manufacturing a part to limit crack propagation through the part. The method includes providing an additive manufacturing system comprising an electrode head comprising an array of multiple electrodes for depositing material layer by layer to form the part, wherein the array of multiple electrodes includes a first plurality of electrodes formed from a first metallic material having a first ductility and a first hardness, and a second plurality of electrodes formed from a second metallic material having a second ductility and a second hardness, wherein the first ductility is greater than the second ductility and the second hardness is greater than the first hardness, a power source configured to provide electrical power for establishing a welding arc for each electrode of the array of multiple electrodes, a drive roll system configured to drive each electrode of the array of multiple electrodes, and a controller operatively connected to the power source. The method further includes additively manufacturing the part from at least the first plurality of electrodes and the second plurality of electrodes, including forming an interior portion of the part using the first plurality of electrodes, forming an exterior portion of the part, surrounding the interior portion of the part, using the second plurality of electrodes, wherein ductility of the interior portion of the part is greater than ductility of the exterior portion of the part. In one embodiment, the method includes forming a transition portion of the part, extending between the interior portion and the exterior portion, using both of the first plurality of electrodes and the second plurality of electrodes such that the transition portion is an alloy formed from the first metallic material and the second metallic material. In a further embodiment, a proportion of the first metallic material to the second metallic material decreases through the transition portion from the interior portion to the exterior portion. In a further embodiment, the step of forming a transition portion includes adjusting active numbers of electrodes of both of the first plurality of electrodes and the second plurality of electrodes during additive manufacturing, to adjust said proportion from the interior portion to the exterior portion. In one embodiment, the method includes providing an internal cooling conduit for the part, wherein the interior portion of the part is formed around internal cooling conduit. In a further embodiment, the additive manufacturing system further comprises a thermal spray subsystem, and the method includes applying a metallic coating on the internal cooling tube by the thermal spray subsystem.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Embodiments of multiple process additive manufacturing systems and methods are disclosed. Multiple additive manufacturing processes and/or metallic materials are combined and utilized in the creation of near net shape parts, to exploit the advantages provided by the different processes. Example additive manufacturing processes that may be employed in the manufacture of near net shape parts include powder processes, wire processes, laser hot wire processes and thermal spray processes in a single system. By combining high deposition rate and low resolution processes (e.g., wire based) with lower deposition rate but higher resolution processes (e.g., powder based), large parts can be made quickly but also contain finely detailed interior and exterior features which would otherwise require extensive secondary processing. The use of multiple metallic materials in the manufacturing of a part can allow different portions of the part to have different properties, such as ductility or hardness for example, and can allow for the use of inexpensive materials where appropriate.

Figure 1:
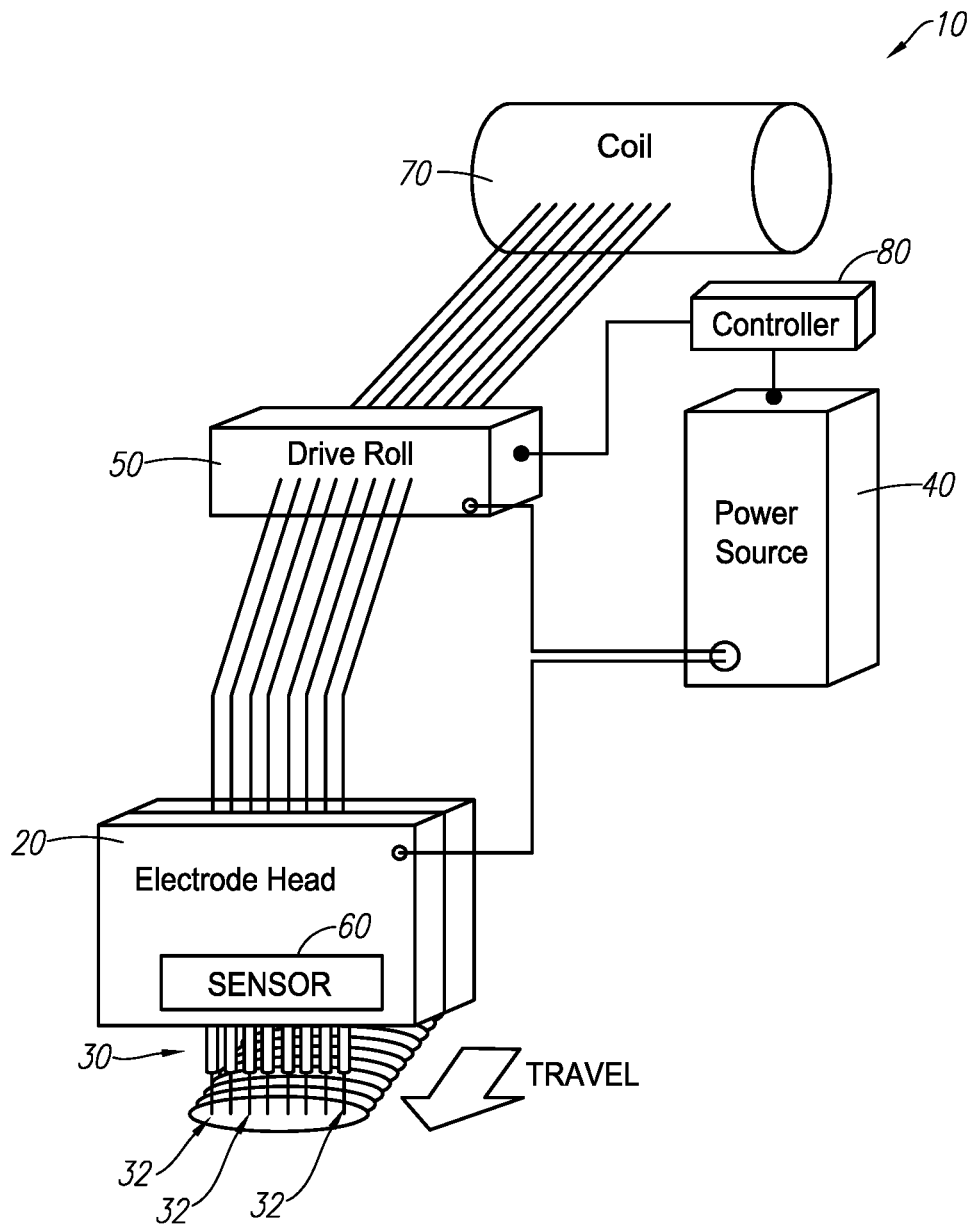
FIG. 1 illustrates an embodiment of a multi-electrode additive manufacturing subsystem.

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 illustrates an embodiment of an example additive manufacturing subsystem, depicted generally at 10, that is part of a multiple process additive manufacturing system. It is envisioned that subsystem 10 may typically be used to additively manufacture a part, layer-by-layer, by a welding process, such as submerged arc or electroslag welding, gas metal arc welding (GMAW), flux-cored arc welding (FCAW), and gas tungsten arc welding (GTAW).

As illustrated in FIG. 1, additive manufacturing subsystem 10 includes an electrode head 20, wherein the electrode head 20 concurrently houses an array 30 of multiple electrodes 32 (e.g. consumable welding electrodes/wires). It is to be appreciated that the multiple electrodes 32 can be continuously fed, periodically fed, or fed based on a predetermined order. The electrodes 32 may be gas-shielded, self-shielded, or metal core or flux cored wires, to be used under gas shielding. In the instance of cored electrodes, it is contemplated that the electrode sheath may be carbon steel, stainless steel, or a nickel alloy. The electrode head 20 houses the array 30 such that electrodes 32 are in a spaced apart configuration for controllably depositing material to form a layer of a 3D part, such as a tool, (e.g., by initially depositing material on a surface of an associated workpiece). It is to be appreciated and understood that the electrode head 20 can be any suitable electrode head that houses the array 30 to deliver the electrodes 32 and the subject innovation is not to be limited by the electrode head illustrated herein. For example, the electrode head 20 can be an assembly that utilizes individual contact tips for the array 30 or a contact assembly that universally houses and encases the electrode array 30. The electrodes 32 may be provided from a coil 70. The coil 70 may include a plurality of individual coils, each coil containing a single electrode (e.g., a welding wire), which are arranged along a common axis of rotation. Still any manner of delivering filler wire or additive material may be chosen without departing from the intended scope of coverage of the embodiments of the subject disclosure. For example, in one embodiment, the electrode head 20 is configured to provide a single consumable metal wire instead of an array of wires.

As illustrated in FIG. 1, electrode head 20 is adapted to receive the array 30 of associated multiple fed electrodes 32. The subsystem 10 includes means for driving the array 30 of electrodes 32 through the electrode head 20. It is envisioned that the means for driving includes a plurality of drive rolls or a drive roll system 50 or other wire feeder device. Each of the plurality of drive rolls 50 may be associated with one or more of the electrodes 32. In one aspect, two electrodes 32 may be associated with a single set of drive rolls 50, although it is envisioned that the relationship between the number of electrodes and the number of wire feeders may be configured such that any number of electrodes may be associated with a single set of drive rolls as appropriate in an additive manufacturing process without departing from the intent of the subject disclosure. In another embodiment, each electrode can be driven by a respective drive roll 50. In another embodiment, the electrode(s) can be driven by drive roll 50 based on a predetermined order or a second predetermined order to which welding arcs are established with one or more electrodes. In other words, if a predetermined order establishes a welding arc between a first electrode, then a second and third electrode, a first drive roll 50 can drive the first electrode and a second drive roll 50 can drive the second and third electrode. Still, other relationships between drive roll 50 and one or more electrodes may be employed with sound engineering judgment.

In one example embodiment, the drive rolls 50 may be configured to drive the electrodes 32 through the electrode head 20 at a rate (e.g., a wire feed speed). In one embodiment, the electrodes 32 can be driven at substantially the same rate. In another embodiment, each electrode 32 can be driven at a respective rate that can be predetermined or dynamically identified during an additive manufacturing procedure. For instance, a rate (e.g., a wire feed speed) for one or more electrodes 32 can be predetermined based on material composition, type of weld, welding parameters, workpiece, among others. In another embodiment, a rate for one or more electrodes can be dynamically identified during the additive manufacturing process based upon criteria such as, but not limited to, user input, feedback, voltage, current, and temperature, among others.

Alternatively, the drive rolls 50 are configured to feed the electrodes 32 at slower and/or faster wire speeds/wire feed rates, where it may be desired to change the current needed to melt off the electrode, thereby changing the heat input by the electrode 32 into the molten layer material. For example, one set of drive rolls 50 may be configured to feed the electrodes 32 arranged at the outside of the array 30 at one wire feed speed, while a different set of drive rolls 50 may be configured to feed the electrodes 32 arranged at the inside of the array 30 at a relatively lower wire feed speed as compared to the wire feed speed of the outer electrodes.

It is to be appreciated that a drive roll 50 can be used to drive one or more electrodes based on a predetermined speed. For instance, each drive roll 50 can be used to drive a respective electrode 32 in the array 30, wherein each electrode is driven at a specific and particular wire feed speed. For instance, the wire feed speed for each electrode 32 can vary based upon, but not limited to, wire type, part material composition, environment (e.g., air temperature, humidity, and the like), wire gauge, electrode type, voltage, current, welding device used to perform the additive manufacturing operation, among others.

In one aspect of the embodiments of the subject invention, each of the electrodes 32 is configured to be connected to welding power source 40. That is to say that during the additive manufacturing process, for instance, welding power can be delivered through each of the electrodes 32 in the array 30. Accordingly, additive material is delivered over a width of the electrode head 20. As indicated above, power may be delivered from the welding power source 40 through welding cables (not shown) as attached at one end to studs (not shown). At the distal end, welding cables may be connected to the electrode head 20 through an electrode head connector. In the exemplary case of a single welding power source 40, a single electrode head connector may convey power from the welding cables commonly to the electrode head 20. Still, other means for conveying power from the welding cables to the electrode head 20 may be employed with sound engineering judgment.

Figure 2:
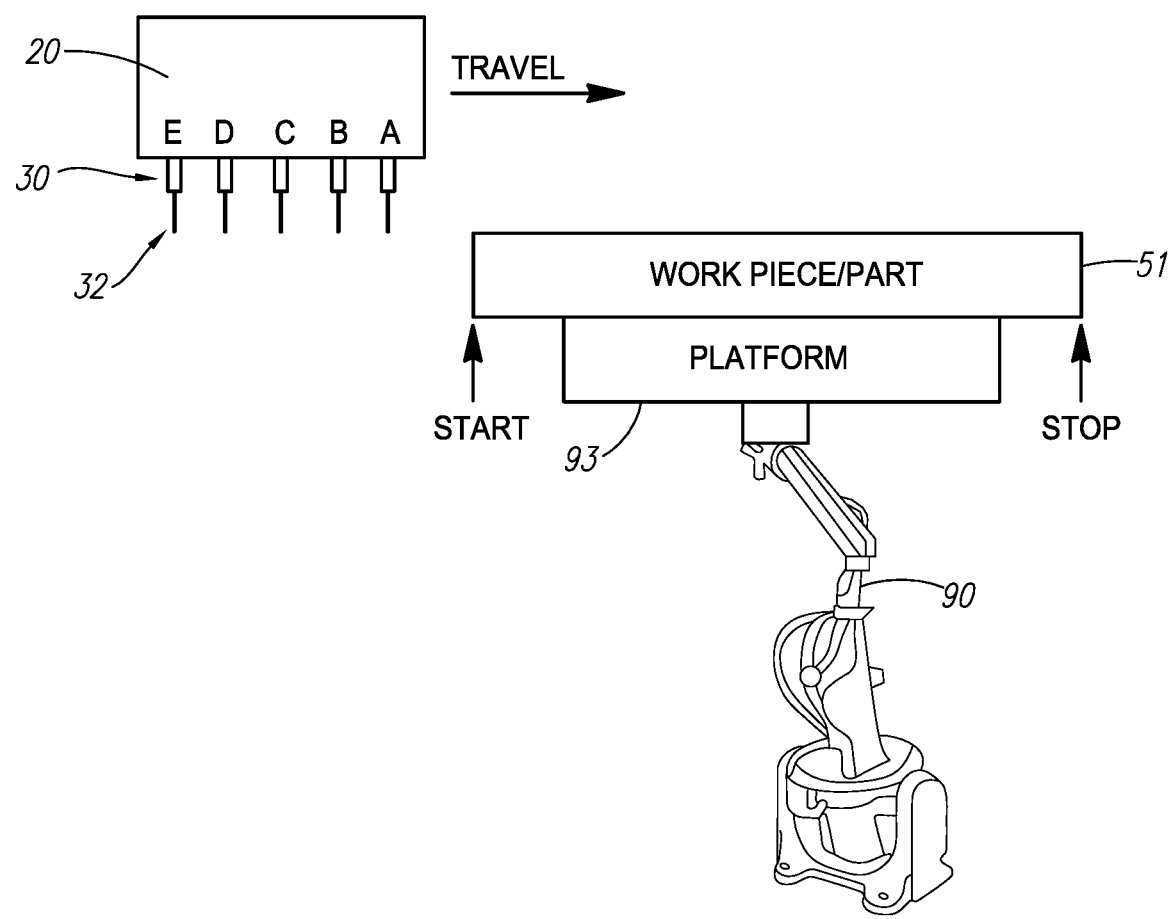
FIG. 2 illustrates an embodiment of an electrode head having multiple electrodes in an array that are configured to deposit material onto a workpiece in a direction of travel.

The power source 40 supplies electrical power for establishing a welding arc between each of the associated multiple fed electrodes and the associated workpiece or part 51 to additively manufacture a tool (see FIG. 2). In particular, one or more power sources 40 can supply power to one or more electrodes 32 of the array 30 based on a predetermined order. For instance, the predetermined order can be based on a location of the electrode head 20 on the workpiece or part 51. In another instance, the predetermined order can be based on a starting of a motion of the electrode head 20 to begin an additive manufacturing process. In another embodiment, one or more power sources 40 terminate the welding arc between each of the associated multiple fed electrodes and the associated workpiece or part 51. In such an embodiment, the one or more power sources 40 can terminate the welding arc for one or more of the electrodes 32 of the array 30 with a second predetermined order. For instance, the second predetermined order can be based on a location of the electrode head 20 on the workpiece or part 51. In another example, the second predetermined order can be based on a stopping of a motion of the electrode head 20 to end an additive manufacturing process.

Furthermore, an establishment of a welding arc between an electrode 32 and the workpiece or part 51 can be provided by at least one of the power source 40 (e.g., supplying power, not supplying power, terminating power supply, and the like) or drive roll(s) 50 (e.g., driving electrode(s), not driving electrode(s), terminating drive of electrode, and the like). Thus, the electrodes 32 in the array 30 can be activated or deactivated based on a predetermined order, wherein the activation and/or deactivation can be based on the power source 40 and/or drive roll(s) 50. In one embodiment, controlled establishment of welding arcs to the electrodes 32 and/or controlled drive to the electrodes 32 is provided for additive manufacturing processes. As such, individual electrodes can be effectively "turned on" or "turned off" to enable the creation of contoured 2D shapes within a layer of the 3D part.

In a particular embodiment, a sensor 60 is configured to detect at least one of a location of the electrode head 20 on the workpiece or part 51, an alignment of at least one electrode 32 of the array 30 compared to the workpiece or part 51, or a nonalignment of at least one electrode 32 of the array 30 compared to the workpiece or part 51. The sensor 60 can be coupled or affixed to the electrode head 20 at a location in order to detect a location of at least one electrode 32 in reference to the workpiece or part 51. For instance, the sensor 60 is situated on the electrode head 20 in a horizontal manner, yet it is to be appreciated that any suitable orientation can be employed. In another embodiment, a plurality of sensors 60 can be used. For example, a sensor can be used for each electrode 32. In such an example, the sensor 60 for each electrode 32 can be oriented vertically in line with the respective electrode 32. By way of example and not limitation, the sensor 60 can be an infrared (IR) sensor or a proximity sensor, among others. The sensor 60 detects alignment and/or nonalignment of at least one electrode 32 with respect to at least a portion of the workpiece or part 51. In particular, the sensor 60 detects whether an electrode 32 is in contact and/or not in contact with a portion of the workpiece or part 51 to establish a welding arc. In another example, the sensor 51 can detect whether a current and/or voltage flow is established through the power source 40 and the workpiece or part 51. It is to be appreciated that an alignment of one or more electrodes 32 refers to a contact that allows a welding arc to establish between the workpiece or part 51 and the electrode 32. Moreover, it is to be appreciated that a nonalignment of one or more electrodes 32 refers to a noncontact that does not allow a welding arc to establish between the workpiece or part 51 and electrode 32.

In accordance with one embodiment, the subsystem 10 includes a controller 80 which controls the power source 40, the drive roll 50, and the electrode head 20. For example, the controller 80 controls the operating characteristics (output voltage, output current, output waveform, etc.) of the electrical power of the power source 40. The controller 80 also controls the operating characteristics of the drive roll 50 (e.g., wire feed speed and arc establishment for each electrode 32 in the array 30). Furthermore, the controller 80 controls the operating characteristics of the electrode head 20 (e.g., position, travel speed, etc.). In accordance with one embodiment, the controller 80 may be integrated into the power source 40. Patterns of multiple layers of a 3D part to be additively manufactured are represented and stored as digital data within the controller 80, in accordance with one embodiment. The controller 80 can be programmed to operate the additive manufacturing system to deposit material at areas defined by a computer aided design (CAD) model of the part.

Referring to FIG. 2 the electrode head 20, having five (5) electrodes 32 in the array 30, can deposit material onto the substrate or part 51 in a controlled direction of travel. A platform 93 and a robot 90 may be used in an additive manufacturing system to rotate and/or translate the substrate or part 51, as controlled by the controller 80, in accordance with one embodiment. In an alternative embodiment, motion of the electrode head 20 may be similarly controlled by the controller 80 to rotate and/or translate the electrode head 20.

In an embodiment, some electrodes 32 in the array 30 have different compositions than other electrodes in the array, allowing for control of the deposition of multiple materials within a layer at various locations and/or to control of a mixing action of materials within a deposited layer. For example, one or more electrodes 32 could be carbon steel and one or more electrodes could be stainless steel, or another metal as desired. The additive manufacturing subsystem 10 including electrodes 32 of varying composition can allow for the manufacturing of near net shape parts, such as tools, from multiple materials. The compositions of the electrodes 32 can be grouped in any manner deemed appropriate for the additive manufacturing process to be performed. For example, electrodes 32 of given compositions can be grouped together adjacent one another. With respect to FIG. 2, electrodes A and B could be one composition, and electrodes C-E could be another composition. The composition of the electrodes 32 can alternate along the electrode head 20 to facilitate mixing of the different metals. For example, electrodes A, C and E could be one composition, and electrodes B and D could be another composition. Other groupings and the use of additional electrodes of varying compositions could be employed in a multiwire additive manufacturing subsystem.

In one example embodiment, some of the electrodes 32 (e.g., a first plurality of electrodes) in the array 30 are made of an expensive alloy or metal as compared to the other electrodes (e.g., a second plurality of electrodes). The inexpensive electrodes can be used to form a portion of the manufactured tool. The electrodes 32 made from the expensive alloy can be used to form the other portions of the manufactured tool. For example, the expensive alloy can be used to apply an outer coating to the tool. Using inexpensive electrodes where possible will serve to reduce the overall cost of the tool. The controller 80 is operatively connected to the power source 40 to control operations of the additive manufacturing system to form the portions of the tool using the appropriate electrodes 32.

In another example embodiment, some of the electrodes 32 in the array 30 are made of a more ductile or lower hardness material (e.g., low carbon steel) as compared to the other electrodes, which may be formed from a harder and less ductile material (e.g., alloy or high carbon steel) to improve the hardness of the manufactured tool. The more ductile material can be used to form the inner portion of the tool, and the hard material can be applied as an outer coating. Hardness of the tool is often needed to perform a manufacturing function. However, such hard tooling may be prone to cracking because the carbon content is so high. Using a more ductile material inside of the harder material can reduce the propagation of cracks through the tool.

Figure 7:
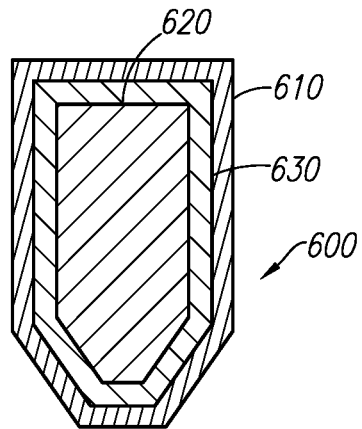
FIG. 7. illustrates an example additively manufactured part.

The mixing of the different materials forming the electrodes 32 can be controlled to provide a desired transition from one metal to another. An abrupt transition from one portion or layer formed from a given material to another portion or layer formed from a different material can result in steep gradients in properties, such as the coefficient of thermal expansion. To reduce the incidence of defects, a slow transition from one material to another can be achieved by depositing layers containing both materials and allowing them to mix. The proportion of one material to the other can be gradually adjusted by activating/deactivating electrodes 32 accordingly, until only the subsequent material is being applied to form the tool. For example, a base of high carbon steel can be slowly transitioned to a stainless steel outer coating. This can be done by activating an increasing number of stainless steel electrodes, and deactivating an increasing number of high carbon steel electrodes, as a cross-section of the tool (e.g., from base to coating) transitions from high carbon to stainless steel. Slowly transitioning from high carbon steel to stainless steel can help to reduce stresses in the manufactured tool due to thermal expansion. FIG. 7 schematically shows an example cross-section of an additively manufactured part 600 formed from different metals provided by the array of electrodes. The exterior portion 610 of the part 600 is formed from a different metallic composition than the interior portion 620. In certain embodiment, the exterior portion 610 can be considered a coating and can have a much thinner cross-section than the interior portion 620. The part 600 also includes a transition portion 630 extending between the interior portion 620 and the exterior portion 610. The transition portion 630 can be formed by blending the metallic material from the different electrodes in the array, to form an alloy (e.g., formed from first and second metallic materials). The transition portion 630 could have a consistent composition across its cross-section, or provide a slow transition from one material to another. For example, a proportion of a first metallic material forming the interior portion 620 to a second metallic material forming the exterior portion 610 can decrease through the transition portion 630 from the interior portion to the exterior portion.

Any number of different electrodes 32 formed from different materials can be used in the additive manufacturing subsystem 10 described above, and the subsystem need not be limited to electrodes 32 formed from two different materials, but could include more than two different types of electrodes.

Figure 3:
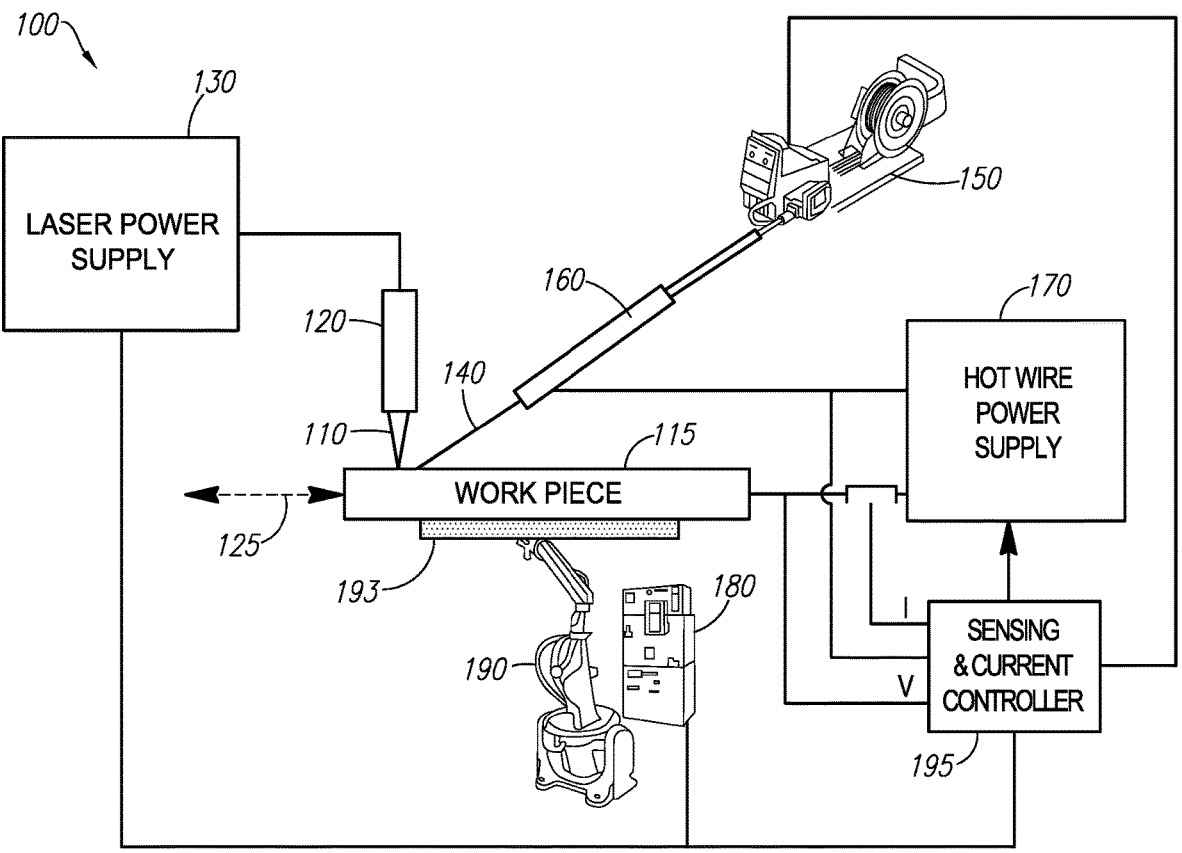
FIG. 3 illustrates an embodiment of a laser hot wire (LHW) additive manufacturing subsystem.

FIG. 3 illustrates a functional schematic block diagram of an exemplary embodiment of a combination filler wire feeder and energy source subsystem 100 for performing additive manufacturing. In one embodiment, FIG. 3 illustrates an embodiment of a laser hot wire (LHW) additive manufacturing subsystem. The laser hot wire additive manufacturing subsystem can be used in conjunction with the multiwire subsystem described above, to manufacture a tool for example. The subsystem 100 includes a laser subsystem capable of focusing a laser beam 110 onto a workpiece or part 115 to heat the workpiece or part 115. The laser subsystem is a high intensity energy source. The laser subsystem can be any type of high energy laser source, including but not limited to carbon dioxide, Nd:YAG, Yb-disk, YB-fiber, fiber delivered, or direct diode laser systems. Other embodiments of the system may include at least one of an electron beam, a plasma arc welding subsystem, a gas tungsten arc welding subsystem, a gas metal arc welding subsystem, a flux cored arc welding subsystem, or a submerged arc welding subsystem serving as the high intensity energy source. In accordance with another embodiment, a portion of the elements of the system 100 may be configured as a blown powder system.

The following will repeatedly refer to the laser system, the beam, and the power supply. However, it should be understood that this reference is exemplary, as any high intensity energy source may be used. For example, a high intensity energy source can provide at least 500 $W/cm^2$. The laser subsystem includes a laser device 120 and a laser power supply 130 operatively connected to each other. The laser power supply 130 provides power to operate the laser device 120.

The additive manufacturing subsystem 100 also includes a hot filler wire feeder subsystem capable of providing at least one resistive filler wire 140 to make contact with the workpiece or part 115 in the vicinity of the laser beam 110. Of course, it is understood that by reference to the workpiece or part 115 herein, the molten puddle is considered part of the workpiece or part 115, thus reference to contact with the workpiece or part 115 includes contact with the puddle. The wire feeder subsystem includes a filler wire feeder 150, a contact tube 160, and a power supply 170. During operation, the filler wire 140 is resistance-heated by electrical current from the power supply 170 which is operatively connected between the contact tube 160 and the workpiece or part 115. In accordance with one embodiment, the power supply 170 is a pulsed direct current (DC) power supply, although alternating current (AC) or other types of power supplies are possible as well. The wire 140 is fed from the filler wire feeder 150 through the contact tube 160 toward the workpiece or part 115 and extends beyond the tube 160. The extension portion of the wire 140 is resistance-heated such that the extension portion approaches or reaches the melting point before contacting a puddle on the workpiece or part. The laser beam 110 serves to melt some of the base metal of the workpiece or part 115 to form a puddle and can also be used to melt the wire 140 onto the workpiece or part 115. The power supply 170 provides energy needed to resistance-melt the filler wire 140. In some embodiments the power supply 170 provides all of the energy needed while in other embodiments the laser or other high energy heat source can provide some of the energy. The feeder subsystem may be capable of simultaneously providing one or more wires, in accordance with certain other embodiments of the present invention.

The system 100 further includes a motion control subsystem capable of moving the laser beam 110 (energy source) and the resistive filler wire 140 in a same direction 125 along the workpiece or part 115 (at least in a relative sense) such that the laser beam 110 and the resistive filler wire 140 remain in a fixed relation to each other. According to various embodiments, the relative motion between the workpiece or part 115 and the laser/wire combination may be achieved by actually moving the workpiece or part 115 or by moving the laser device 120 and the wire feeder subsystem. In FIG. 3, the motion control subsystem includes a motion controller 180 operatively connected to a robot 190 having a platform 193 (e.g., a rotatable platform and/or a translatable platform). The motion controller 180 controls the motion of the robot 190. The robot 190 is operatively connected (e.g., mechanically secured) to the workpiece or part 115 via the platform 193 to move the workpiece or part 115 in the direction 125 such that the laser beam 110 and the wire 140 effectively travel along the workpiece or part 115. In accordance with an alternative embodiment of the present invention, the laser device 110 and the contact tube 160 may be integrated into a single head. The head may be moved along the workpiece or part 115 via a motion control subsystem operatively connected to the head.

In general, there are several methods in which a high intensity energy source/wire may be moved relative to a workpiece or part. If the workpiece or part is round, for example, the high intensity energy source/wire may be stationary and the workpiece or part may be rotated under the high intensity energy source/wire. Alternatively, a robot arm or linear tractor may move parallel to the round workpiece or part and, as the workpiece or part is rotated, the high intensity energy source/wire may move continuously or index once per revolution to, for example, overlay the surface of the round workpiece or part. If the workpiece or part is flat or at least not round, the workpiece or part may be moved under the high intensity energy source/wire as shown in FIG. 3. However, a robot arm or linear tractor or even a beam-mounted carriage may be used to move a high intensity energy source/wire head relative to the workpiece or part. The robot 190 driving the platform 193 may be driven electrically, pneumatically, or hydraulically, in accordance with various embodiments.

The additive manufacturing subsystem 100 further includes a sensing and current control subsystem 195 which is operatively connected to the workpiece or part 115 and the contact tube 160 (i.e., effectively connected to the output of the power supply 170) and is capable of measuring a potential difference (i.e., a voltage V) between and a current (I) through the workpiece or part 115 and the wire 140. The sensing and current control subsystem 195 may further be capable of calculating a resistance value (R=V/I) and/or a power value (P=V*I) from the measured voltage and current. In general, when the wire 140 is in contact with the workpiece or part 115, the potential difference between the wire 140 and the workpiece or part 115 is zero volts or very nearly zero volts. As a result, the sensing and current control subsystem 195 is capable of sensing when the resistive filler wire 140 is in contact with the workpiece or part 115 and is operatively connected to the power supply 170 to be further capable of controlling the flow of current through the resistive filler wire 140 in response to the sensing. In accordance with another embodiment, the sensing and current controller 195 may be an integral part of the power supply 170.

In accordance with one embodiment, the motion controller 180 may further be operatively connected to the laser power supply 130 and/or the sensing and current controller 195. In this manner, the motion controller 180 and the laser power supply 130 may communicate with each other such that the laser power supply 130 knows when the workpiece or part 115 is moving and such that the motion controller 180 knows if the laser device 120 is active. Similarly, in this manner, the motion controller 180 and the sensing and current controller 195 may communicate with each other such that the sensing and current controller 195 knows when the workpiece or part 115 is moving and such that the motion controller 180 knows if the filler wire feeder subsystem is active. Such communications may be used to coordinate activities between the various subsystems of the additive manufacturing system 100.

Figure 4:
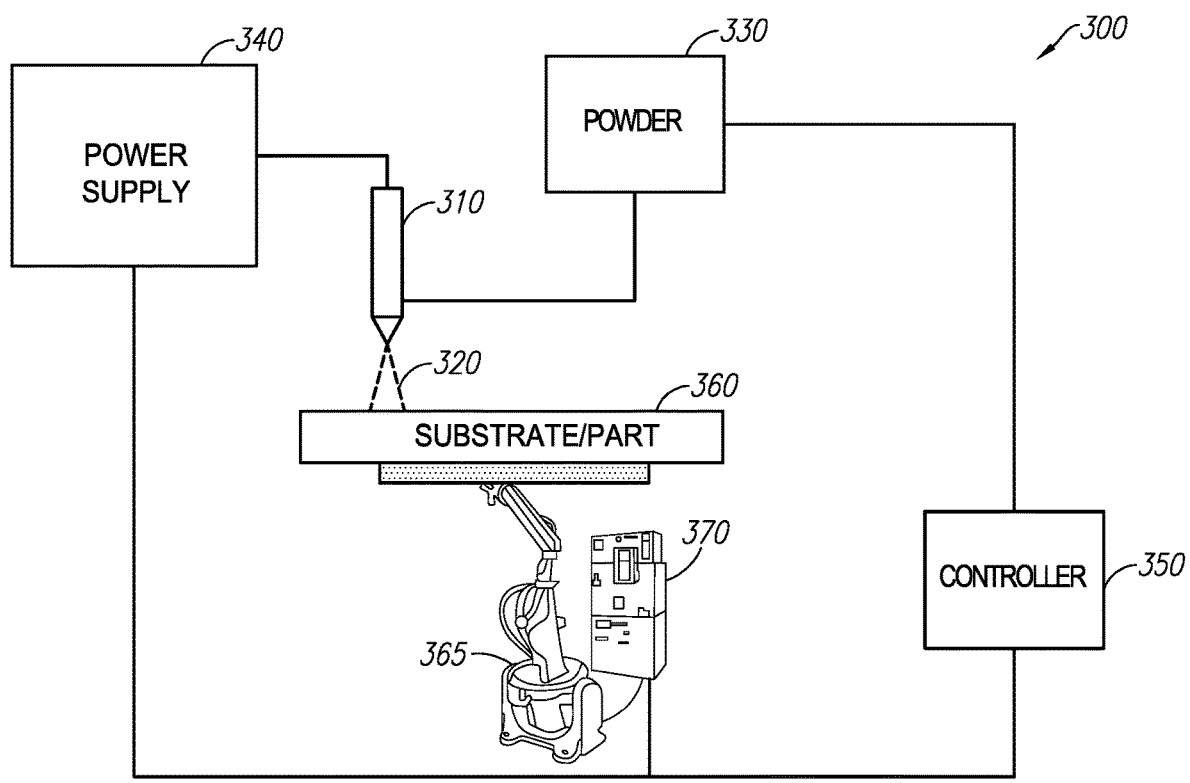
FIG. 4 illustrates an embodiment of a plasma or thermal spray additive manufacturing subsystem.

FIG. 4 illustrates a schematic block diagram of an exemplary embodiment of a plasma or thermal spray subsystem 300 for performing additive manufacturing. The plasma or thermal spray subsystem 300 can be used in conjunction with the multiwire subsystem or the laser hot wire subsystem described above, to manufacture a tool for example. The plasma or thermal spray subsystem 300 includes a plasma torch 310 that creates a plasma jet 320 to melt and deposit a feedstock (e.g., metallic powder 330) to coat a substrate. In the manufacturing of machine tools, a thermal spray process can be used to coat the tool with a hardened surface for example. The plasma or thermal spray subsystem 300 further includes a power supply 340 to power the plasma torch 310, and a controller 350 to control the operations of the plasma or thermal spray subsystem. The plasma or thermal spray subsystem 300 can further include a motion control subsystem similar to that discussed above with respect to a laser hot wire additive manufacturing subsystem. For example, the plasma or thermal spray subsystem 300 can control relative motion between the substrate 360 and plasma torch 310 using a robot 365 and associated motion controller 370. The robot 365 is shown schematically as being attached to the substrate 360 to move the substrate relative to the plasma torch 310. However, the robot 365 could be connected to the plasma torch 310 to move the torch relative to the substrate 360. Plasma or thermal spraying additive manufacturing devices are known in the art and need not be described in detail.

Figure 5:
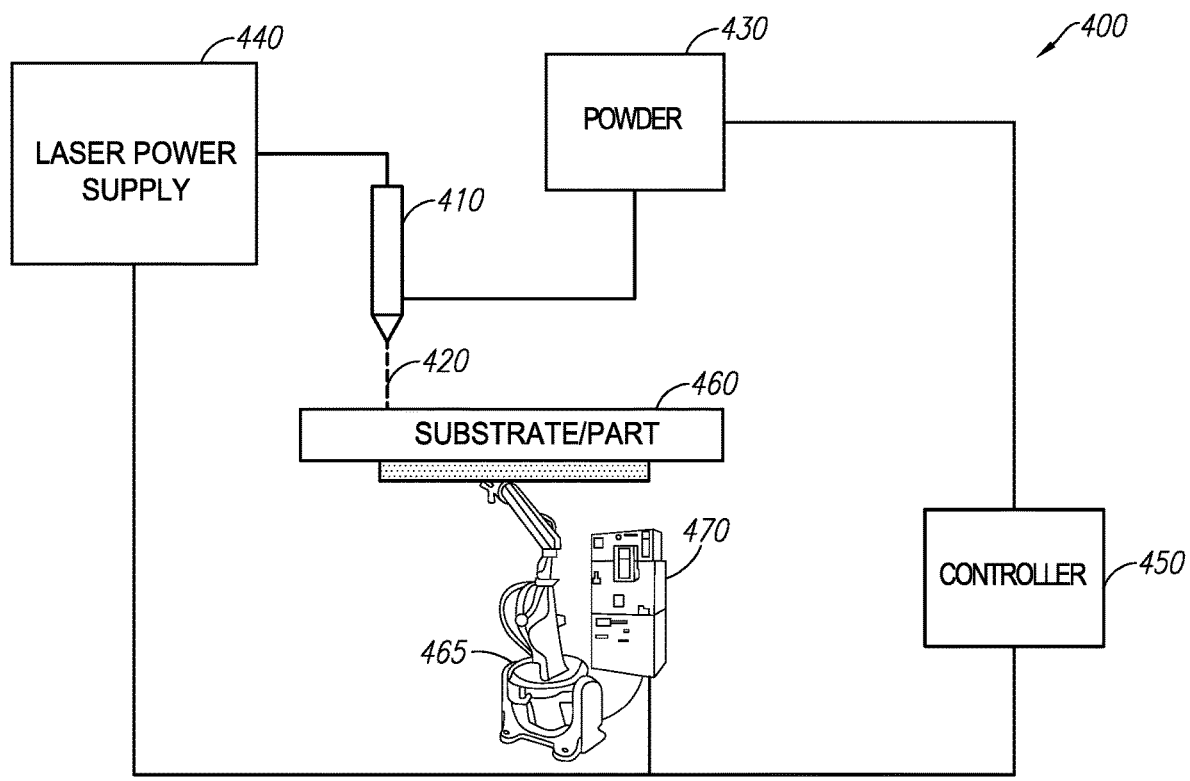
FIG. 5 illustrates and embodiment of a blown powder laser additive manufacturing subsystem.

FIG. 5 illustrates a schematic block diagram of an exemplary embodiment of a blown powder laser subsystem 400 for performing additive manufacturing using a laser beam and coaxial powder flow. The blown powder laser subsystem 400 can be used in conjunction with the multiwire subsystem, the laser hot wire subsystem, and/or the plasma or thermal spray subsystem described above, to manufacture a tool for example. The blown powder laser subsystem 400 includes a laser device 410 that directs a laser beam 420 toward a substrate 460, coaxial with a supply of powdered metal 430 to sinter the metallic material and coat the substrate. The blown powder laser subsystem 400 can be used to coat manufactured tools (e.g., with a hard exterior surface), or build tools layer by layer. The blown powder laser subsystem 400 further includes a laser power supply 440 connected to the laser device 410, and a controller 450 to control the operations of the blown powder laser subsystem. The blown powder laser subsystem 400 can further include a motion control subsystem similar to that discussed above with respect to a laser hot wire additive manufacturing subsystem. For example, the blown powder laser subsystem 400 can control relative motion between the substrate 460 and laser device 410 using a robot 465 and associated motion controller 470. The robot 465 is shown schematically as being attached to the substrate 460 to move the substrate relative to the laser device 410. However, the robot 465 could be connected to the laser device 410 to move the laser device relative to the substrate 410. Blown powder laser additive manufacturing devices are known in the art and need not be described in detail.

Various example additive manufacturing processes (wire processes, thermal spray processes, powder processes) have been described above for use in the manufacturing of tools. These processes have advantages and disadvantages, but can be used together in a single system during the manufacturing process to maximize the advantages that they provide. For example, the electrode head 20 of the multiwire system of FIG. 1 can be provided as part of an interchangeable end of arm tool (EOAT) for a robot. Similarly, the laser devices and plasma torch described above can be provided as EOATs for the robot. During additive manufacturing of a machine tool, the robot can utilize the various additive manufacturing EOATs to form different portions of the machine tool. Some portions of the tool may be quickly built up using a higher speed, lower resolution process, such as a multiwire process depicted in FIG. 1 or the laser hot wire process depicted in FIG. 3. Other portions having fine details might benefit from a lower speed, higher resolution process, such as the blown powder process depicted in FIG. 5. Still other portions, such as an exterior surface of the machine tool, might benefit from a thermal spray coating (FIG. 4). In a multiprocess system, the robot is programmed to form different portions of the machine tool using appropriate additive manufacturing EOATs to improve the manufacturing speed and/or reduce the overall cost of the tool. The use of multiple processes in a single system (e.g., using a single robot and multiple additive manufacturing EOATs) can enable the production of tools containing a variety of length scales. By combining higher deposition rate and lower resolution processes with lower deposition rate but higher resolution processes, large tools can be made quickly but also contain finely detailed interior and exterior features which would otherwise require extensive secondary processing (e.g., machining).

Such a multiprocess system also enables the use of multiple different materials in a structure that would otherwise not necessarily be possible or readily producible. Some materials are only commercially available in either a powder or wire form. Thus, a multiprocess system can allow such materials to be included in a common tool. Other materials may benefit from deposition with one process over another process. For example, a laser hot wire using cored wires containing carbides will deposit differently than an arc-based process. Thus, the appropriate additive manufacturing process can be chosen for a desired material based on its deposition characteristics.

Figure 6A:
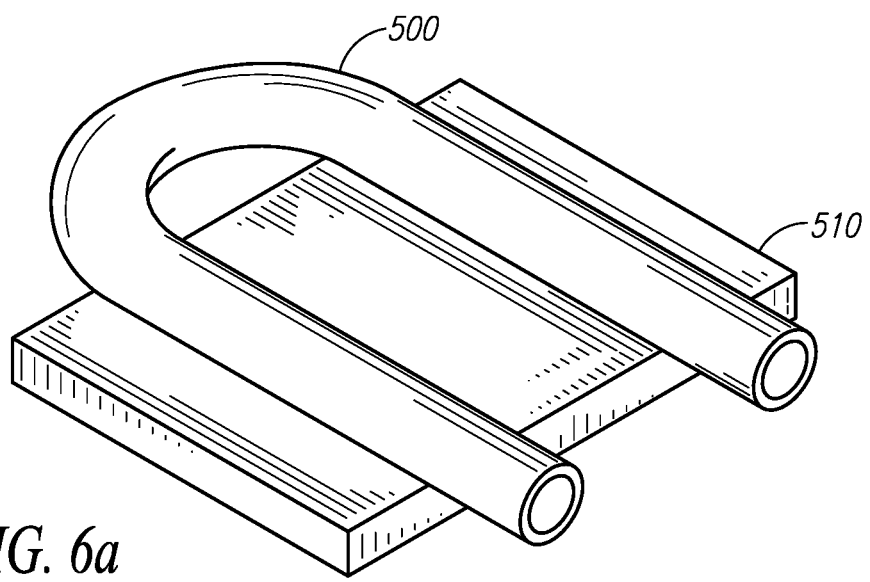
FIG. 6a, FIG. 6b, and FIG. 6c illustrates the additive manufacturing of a portion of a machine tool with embedded cooling conduits.
Figure 6B:
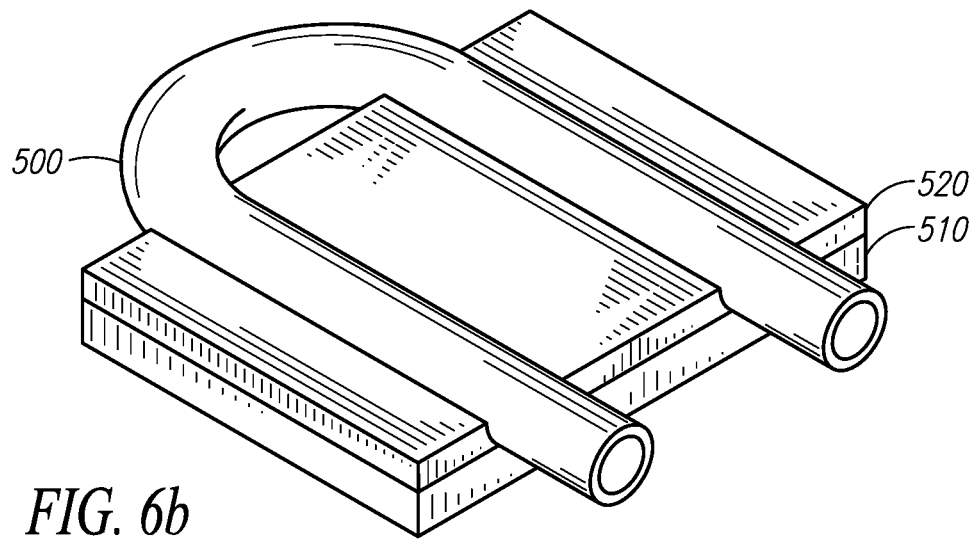
Figure 6C:
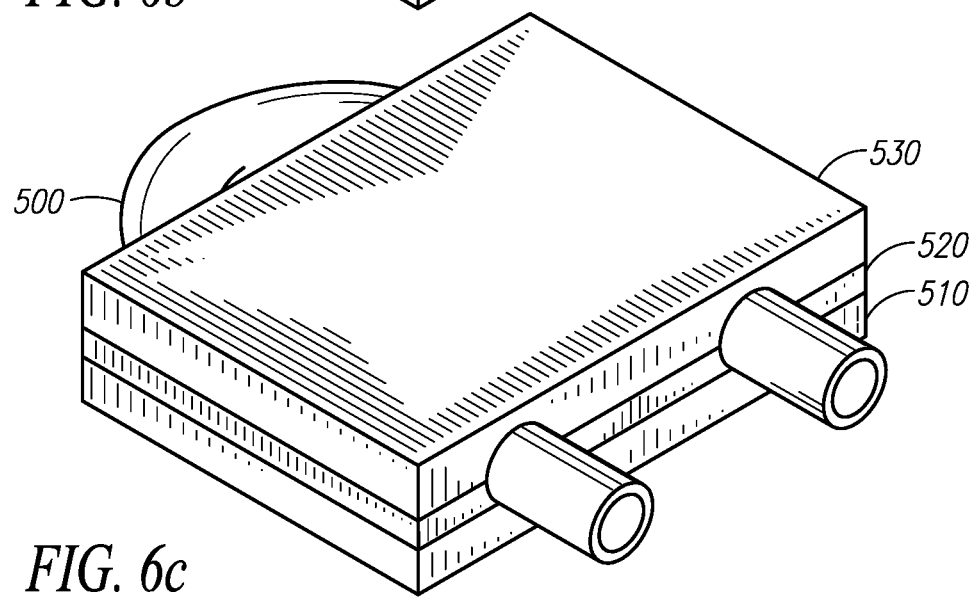

FIG. 6 schematically shows how a portion of a machine tool can be additively manufactured so as to include internal cooling conduits 500. It can be necessary to remove heat from tooling while it is in use. Additive manufacturing can allow machine tools of complex shape to be created and allow cooling conduits of various shapes to be embedded in the tooling. The cooling conduits can have shapes that would be difficult or impossible to embed in conventionally manufactured tooling, and the cooling conduits can be precisely located within the tool to maximize heat removal from potential localized hot spots, for example. The cooling conduits 500 can be placed onto a substrate 510 that is part of the machine tool to be manufactured. The substrate 510 can itself be additively manufactured using, for example, one of the subsystems described above. Alternatively, the substrate 510 can be formed from stock material using a conventional machining process. Layers 520, 530 can be built up around the cooling conduits 500 to form the tool, using any of the additive manufacturing subsystems described above. For example, the cooling conduits 500 can be initially coated using a thermal spray or blown powder laser subsystem, and the layers 520, 530 can be built up around the coated cooling conduits using a multi-electrode or laser hot wire subsystem. The multi-electrode subsystem can be used when a high deposition rate is desired. However, a different subsystem can be used when high resolution, precise deposition is desired (e.g., laser hot wire or blown powder), such as near the edges of the tool or around the cooling conduits 500. A high resolution process can produce finely detailed interior and exterior features which would otherwise require extensive secondary processing. In certain embodiments, internal portions of the tool can be formed from a ductile or inexpensive material, and the outer surfaces of the tool can be formed from a harder and/or more expensive material. If desired, a slow transition can be made from an internal material to an external material by mixing metals during additive manufacturing, to gradually adjust their proportions (e.g., to reduce stresses in the tool due to thermal expansion of its constituent metals). It is to be appreciated that the layers 510, 520, 530 could be formed using a conventional machining process to include openings for the cooling conduits 500. After the cooling conduits 500 are installed in the layers 510, 520, 530, the layers could be attached together using a welding process, and then the tool coated, using a plasma or thermal spray for example.

Figure 8:
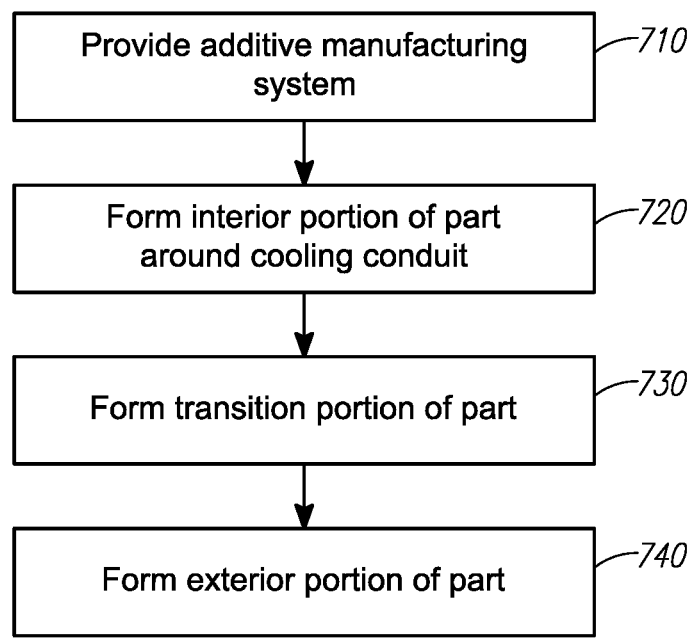
FIG. 8 illustrates a flow chart of an example method of additively manufacturing a part.

FIG. 8 illustrates a flow chart of an example embodiment of a method to additively manufacture a part, (e.g., to limit crack propagation through the part). At 710, the additive manufacturing system is provided. The additive manufacturing system can include an electrode head comprising an array of multiple electrodes for depositing material layer by layer to form a part, wherein the array of multiple electrodes includes a first plurality of electrodes formed from a first metallic material having a first ductility and a first hardness, and a second plurality of electrodes formed from a second metallic material having a second ductility and a second hardness, wherein the first ductility is greater than the second ductility and the second hardness is greater than the first hardness. The additive manufacturing system can further include a power source configured to provide electrical power for establishing a welding arc for each electrode of the array of multiple electrodes, a drive roll system configured to drive each electrode of the array of multiple electrodes, and a controller operatively connected to the power source. The method further includes additively manufacturing the part from at least the first plurality of electrodes and the second plurality of electrodes. Additively manufacturing the part can include forming an interior portion of the part using the first plurality of electrodes 720. An internal cooling conduit can be provided for the part, and the interior portion can be formed around the internal cooling conduit via additive manufacturing techniques. The method can further include forming a transition portion of the part 730, extending between the interior portion and the exterior portion, using both of the first plurality of electrodes and the second plurality of electrodes such that the transition portion is an alloy formed from the first metallic material and the second metallic material. A proportion of the first metallic material to the second metallic material can decrease through the transition portion from the interior portion to the exterior portion. The step of forming the transition portion 730 can include adjusting active numbers of electrodes of both of the first plurality of electrodes and the second plurality of electrodes during additive manufacturing, to adjust the proportion of the first metallic material to the second metallic material from the interior portion to the exterior portion. The method can further include forming an exterior portion of the part 740, surrounding the interior portion of the part, using the second plurality of electrodes. The ductility of the interior portion of the part can be greater than ductility of the exterior portion of the part to limit crack propagation through the part.

Figure 9:
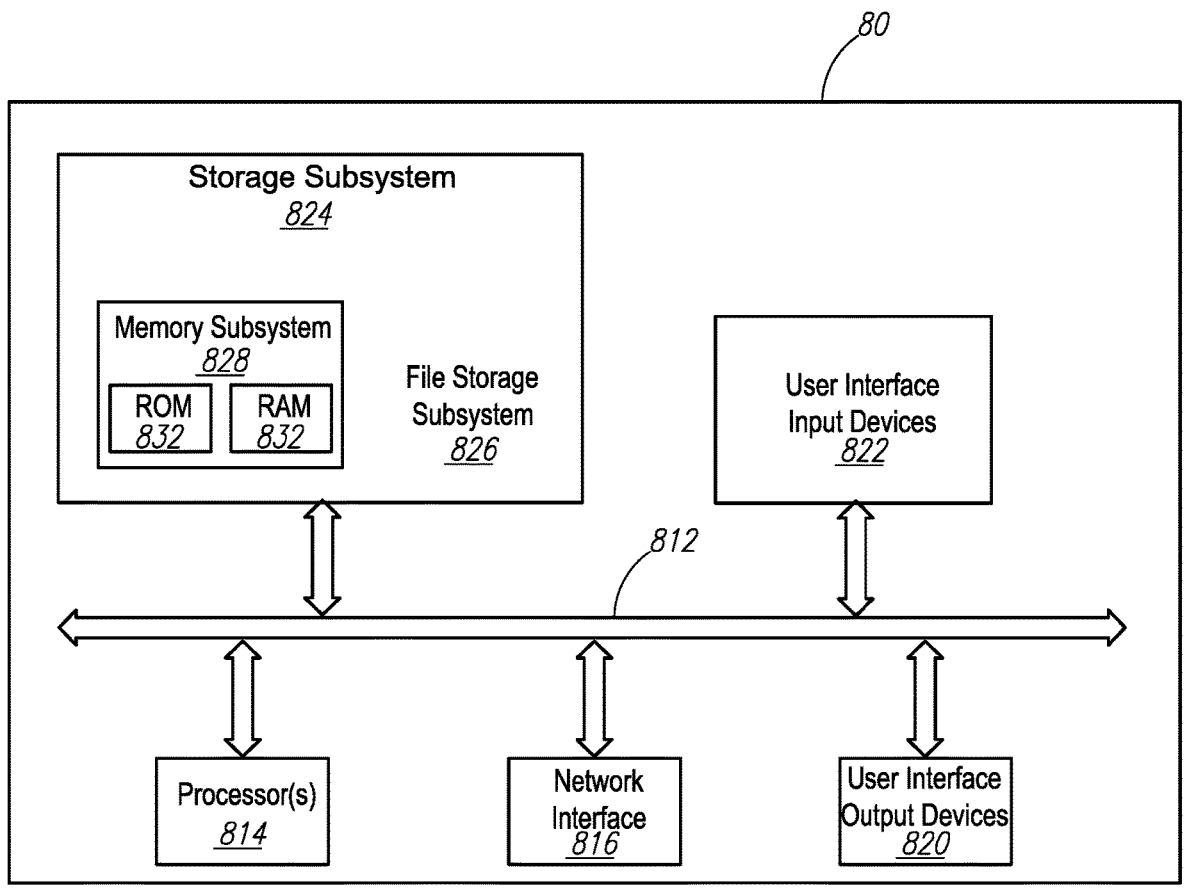
FIG. 9 illustrates an embodiment of an example controller of an additive manufacturing subsystem.

FIG. 9 illustrates an embodiment of an example controller 80 of an additive manufacturing subsystem. The controller 80 includes at least one processor 814 which communicates with a number of peripheral devices via bus subsystem 812. These peripheral devices may include a storage subsystem 824, including, for example, a memory subsystem 828 and a file storage subsystem 826, user interface input devices 822, user interface output devices 820, and a network interface subsystem 816. The input and output devices allow user interaction with the controller 80. Network interface subsystem 816 provides an interface to outside networks and is coupled to corresponding interface devices in other computer systems. For example, the motion controller 180 of the system 100 may share one or more characteristics with the controller 80 and may be, for example, a conventional computer, a digital signal processor, and/or other computing device.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 80 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 80 to the user or to another machine or computer system.

Storage subsystem 824 stores programming and data constructs that provide the functionality of some or all of the modules described herein. For example, the storage subsystem 824 may include a CAD model of a part, such as a tool, to be additively manufactured and the logic to identify variations in a welding location and adjust a welding device to accommodate the identified variations.

These software modules are generally executed by processor 814 alone or in combination with other processors. Memory 828 used in the storage subsystem can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 826 in the storage subsystem 824, or in other machines accessible by the processor(s) 814.

Bus subsystem 812 provides a mechanism for letting the various components and subsystems of the controller 80 communicate with each other as intended. Although bus subsystem 812 is shown schematically as a single bus, alternative embodiments of the bus subsystem may use multiple buses.

The controller 80 can be of varying types including a workstation, server, computing cluster, blade server, server farm, or any other data processing system or computing device. Due to the ever-changing nature of computing devices and networks, the description of the controller 80 depicted in FIG. 9 is intended only as a specific example for purposes of illustrating some embodiments. Many other configurations of the controller 80 are possible having more or fewer components than the controller depicted in FIG. 9.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

The invention claimed is:

1. An additive manufacturing system, comprising:
a single electrode head comprising an array of multiple consumable electrodes for depositing material layer by layer to form a three-dimensional (3D) part, wherein the array of multiple consumable electrodes includes a first plurality of consumable electrodes formed from a first metallic material having a first ductility and a first hardness, and a second plurality of consumable electrodes formed from a second metallic material having a second ductility and a second hardness, wherein the first metallic material is different from the second metallic material such that the first ductility is greater than the second ductility and the second hardness is greater than the first hardness;
a power source configured to selectively provide electrical power to each consumable electrode of the array of multiple consumable electrodes to selectively establish electrical arcs from the first plurality of consumable electrodes or the second plurality of consumable electrodes;
a drive roll system configured to drive each consumable electrode of the array of multiple consumable electrodes; and
a controller operatively connected to the power source and configured to:
select the first plurality of consumable electrodes and control operations of the additive manufacturing system to form an interior portion of the three-dimensional (3D) part using electrical arcs from the first plurality of consumable electrodes and not the second plurality of consumable electrodes, and select the second plurality of consumable electrodes and control the operations of the additive manufacturing system to form an exterior portion of the three-dimensional (3D) part, including an outer surface of the three-dimensional (3D) part surrounding the interior portion of the three-dimensional (3D) part, using electrical arcs from the second plurality of consumable electrodes and not the first plurality of consumable electrodes, such that ductility of the interior portion of the three-dimensional (3D) part is greater than ductility of the exterior portion of the three-dimensional (3D) part, wherein the electrical arcs from each consumable electrode of the array of multiple consumable electrodes can be individually activated or deactivated when forming the three-dimensional (3D) part, and wherein the controller is configured to control the operations of the additive manufacturing system to form a transition portion of the three-dimensional (3D) part, extending between the interior portion and the exterior portion, using the electrical arcs from both of the first plurality of consumable electrodes and the second plurality of consumable electrodes and adjusting active numbers of electrodes of both the first plurality of consumable electrodes and the second plurality of consumable electrodes such that the transition portion is an alloy formed from the first metallic material and the second metallic material and, within the transition portion, a proportion of the first metallic material to the second metallic material decreases through the transition portion from the interior portion to the exterior portion.

2. The additive manufacturing system of claim 1, wherein the controller is programmed to operate the additive manufacturing system to deposit the material at areas defined by a computer aided design (CAD) model of the three-dimensional (3D) part.

3. The additive manufacturing system of claim 1, further comprising a thermal spray subsystem operatively connected to the controller, wherein the thermal spray subsystem includes a feedstock of metallic powder and a plasma torch configured to generate a plasma jet that melts the metallic powder, and wherein the controller is configured to control operations of the thermal spray subsystem to apply a metallic coating on the three-dimensional (3D) part.

4. The additive manufacturing system of claim 1, further comprising a blown powder laser subsystem operatively connected to the controller, wherein the controller is configured to control operations of the blown powder laser subsystem to form a high resolution portion of the three-dimensional (3D) part that is higher in resolution than said interior portion and said exterior portion.

5. An additive manufacturing system, comprising:
a single electrode head comprising an array of multiple wire electrodes for depositing material layer by layer to form a three-dimensional (3D) machine tool around a plurality of cooling conduits located on an additively-manufactured substrate forming a part of the machine tool, wherein the array of multiple wire electrodes includes a first plurality of wire electrodes formed from a first metallic material having a first ductility and a first hardness, and a second plurality of wire electrodes formed from a second metallic material having a second ductility and a second hardness, wherein the first metallic material is different from the second metallic material such that the first ductility is greater than the second ductility and the second hardness is greater than the first hardness;

a power source configured to selectively provide electrical power to each wire electrode of the array of multiple wire electrodes to selectively establish electrical arcs from the first plurality of wire electrodes or the second plurality of wire electrodes of the single electrode head;

a drive roll system configured to drive each wire electrode of the array of multiple wire electrodes; and a controller operatively connected to the power source and configured to:

select the first plurality of wire electrodes and control operations of the additive manufacturing system to form an interior portion of the machine tool around the plurality of cooling conduits using electrical arcs from the first plurality of wire electrodes and not the second plurality of wire electrodes, and select the second plurality of wire electrodes and control the operations of the additive manufacturing system to form an exterior portion of the machine tool, including an outer surface of the machine tool surrounding the interior portion of the machine tool and the cooling conduits, using electrical arcs from the second plurality of wire electrodes and not the first plurality of wire electrodes, such that ductility of the interior portion of the machine tool is greater than ductility of the exterior portion of the machine tool, wherein the electrical arcs from each wire electrode of the array of multiple wire electrodes can be individually activated or deactivated when forming the three-dimensional (3D) part, wherein the controller is configured to control the operations of the additive manufacturing system to form a transition portion of the machine tool, extending between the interior portion and the exterior portion, using the electrical arcs from both of the first plurality of wire electrodes and the second plurality of wire electrodes and adjusting active numbers of electrodes of both the first plurality of wire electrodes and the second plurality of wire electrodes such that the transition portion is an alloy formed from the first metallic material and the second metallic material and, within the transition portion, a proportion of the first metallic material to the second metallic material decreases through the transition portion from the interior portion to the exterior portion.

6. The additive manufacturing system of claim 5, wherein the controller is programmed to operate the additive manufacturing system to deposit the material at areas defined by a computer aided design (CAD) model of the machine tool.

7. The additive manufacturing system of claim 5, further comprising a thermal spray subsystem operatively connected to the controller, wherein the thermal spray subsystem includes a feedstock of metallic powder and a plasma torch configured to generate a plasma jet that melts the metallic powder, and wherein the controller is configured to control operations of the thermal spray subsystem to apply a metallic coating on the machine tool.

8. The additive manufacturing system of claim 5, further comprising a blown powder laser subsystem operatively connected to the controller, wherein the controller is configured to control operations of the blown powder laser subsystem to form a high resolution portion of the machine tool that is higher in resolution than said interior portion and said exterior portion.

\* \* \* \* \*